United States Patent [19]
Matthews

[11] 3,902,785
[45] Sept. 2, 1975

[54] OPTICAL WAVEGUIDE COUPLER

[75] Inventor: Michael Robert Matthews, London, England

[73] Assignee: The Post Office, London, England

[22] Filed: Aug. 21, 1974

[21] Appl. No.: 499,281

[30] Foreign Application Priority Data
Sept. 25, 1973 United Kingdom............... 44969/73

[52] U.S. Cl. ......................... 350/96 C; 350/96 WG
[51] Int. Cl.² ........................................... G02B 5/14
[58] Field of Search .......... 350/96 C, 96 WG, 96 R, 350/96 B

[56] References Cited
UNITED STATES PATENTS
3,734,594  5/1973  Trambarulo ..................... 350/96 C
3,846,010  11/1974  Love et al. ..................... 350/96 C

*Primary Examiner*—John K. Corbin
*Assistant Examiner*—Jon W. Henry
*Attorney, Agent, or Firm*—Kemon, Palmer & Estabrook

[57] ABSTRACT

A dielectric optical waveguide coupling consists of a pair of identical plugs engaged in a double socket. Each plug consists of a sleeve and capillary bore glass tube within the sleeve arranged so that an annular space exists between an interior wall of the sleeve and an exterior wall of the tube. A dielectric optical waveguide is threaded through the capillary bore and rigidly fixed therein. A slide, consisting of a tube, can slide within the annular space. A second length of capillary bore tube is fixed within the slide, and the dielectric optical waveguide is partially inserted within, and is free to slide with respect to the bore of this tube. The socket consists of a third length of capillary bore tube surrounded by a collar. On inserting the plugs into the socket the slide moves backwards causing two lengths of dielectric optical waveguide, one from each plug, to enter the bore of the third length of capillary bore tube. When two lengths of dielectric optical waveguide abutt, an optical coupling is formed and the plugs can be locked in position. A modification of the coupling permits the simultaneous joining of a plurality of dielectric optical waveguides.

25 Claims, 8 Drawing Figures

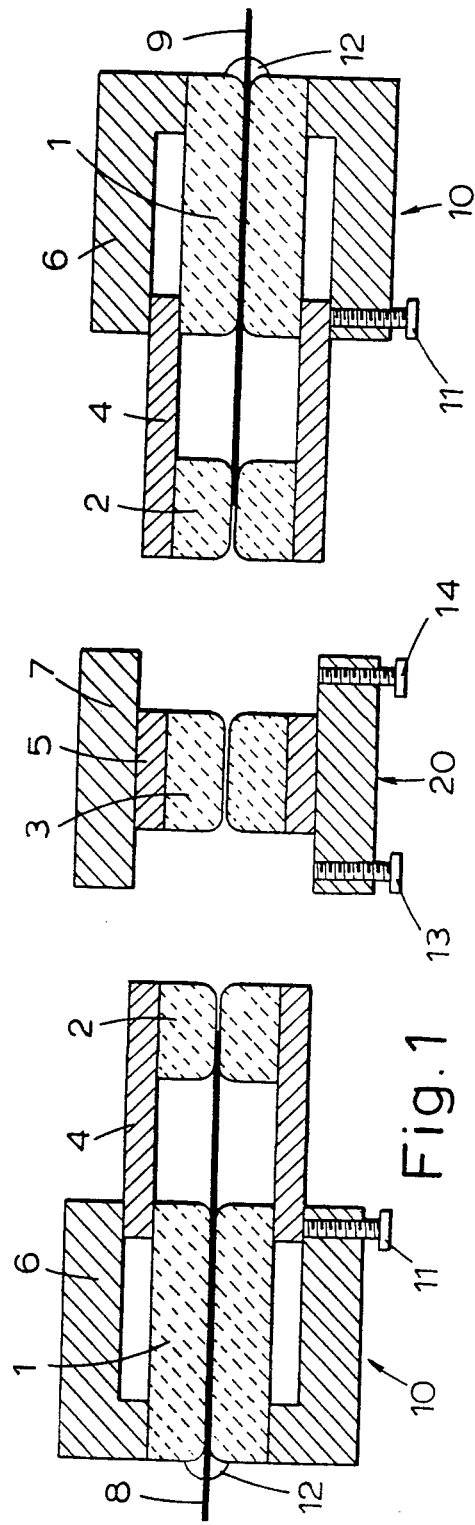
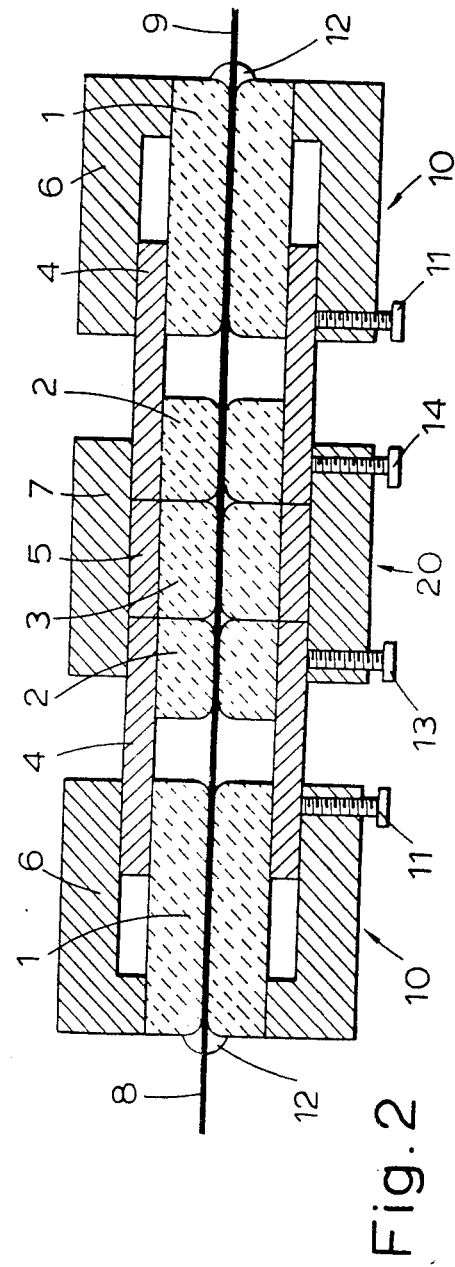
Fig. 1
Fig. 2

Before Jointing.

After Jointing.

OPTICAL WAVEGUIDE COUPLER

The present invention relates to, couplers for dielectric optical waveguides.

The terms "light" and "optical" as herein used are to be interpreted as covering those regions of the electromagnetic spectrum more usually designated as the "infra-red," "visible," and "ultra-violet."

The term "optical fibre" is to be given the same meaning as "dielectric optical waveguide."

The ideal jointing technique for optical fibres should meet the following requirements:

a. the joint produced should have a high transmission efficiency,
b. no great skill should be required to make the joint,
c. the joint should be inexpensive,
d. the joint should be adaptable for making simultaneous joints between a large number of optical fibres as in a cable.

Many prior art devices fail to meet one or more of the above requirements. Two examples of prior art techniques will be briefly mentioned. The first technique consists of butting the ends of the two optical fibres to be joined, and fusing the ends together. This technique entails the use of elaborate positioning apparatus to enable the optical fibre to be correctly positioned prior to fusing. This requires considerable operator skill and the use of complex and expensive equipment. The second technique consists of positioning the optical fibres to be joined in a groove in a plate, sliding the ends together, positioning a second plate on top of the fibres and clamping the plates together. This technique is difficult to adapt to handle a large number of fibres simultaneously and in addition involve the use of clamps.

The present invention which is a modification of the invention disclosed in out co-pending applications Ser. Nos. 497,095 and 497,094 filed Aug. 13, 1974, seeks to avoid the above mentioned disadvantages and may provide a cheap, easily used dielectric optical coupler having a high transmission efficiency and adaptable for the simultaneous coupling of a large number of optical fibres.

The invention disclosed in our co-pending U.S. application Ser. No. 497,095 filed Aug. 13, 1974. consists of a capillary bore tube, into which are inserted, from each end of the tube, two optical fibres to be joined. The capillary bore is tapered at each end to facilitate the insertion of the fibres. The fibres are pushed into the capillary bore until their ends butt. The capillary bore may be filled with a refraction index matching fluid to enhance the transmission efficiency of the coupling.

According to a first aspect of the present invention there is provided a three-part dielectric optical waveguide coupling for optically coupling two lengths of dielectric optical waveguide consisting of two plug means engaged in a socket means; each of said plug means comprising a plug body member rigidly fixed to one of said lengths of dielectric optical waveguide, a side means in unidirectional sliding engagement with said plug body member, a guide member rigidly fixed to said slide means, said one length of dielectric optical waveguide disposed at least partially within a first dielectric optical waveguide guideway extending through said guide member, said guide member slide means movable axially of said one length of dielectric optical waveguide; said socket means comprising a socket body having a second dielectric optical waveguide guideway extending therethrough between first and second faces of said socket body, said socket body located within a collar member, and first and second faces and said collar member defining two plug engaging means each arranged to receive and engage said slide means such that said first and second guideways are in register.

According to a second aspect of the present invention there is provided a dielectric optical waveguide coupler plug for use with a three-part dielectric optical waveguide coupling, comprising a plug body member rigidly fixed to a dielectric optical waveguide retaining means, a slide means in uni-directional sliding engagement with said plug body member, a guide member rigidly fixed to said slide means, said guide member and slide means movable axially with respect to said dielectric optical waveguide retaining means.

According to a third aspect of the present invention there is provided a dielectric optical waveguide coupler socket for use in a three-part dielectric optical waveguide coupling, comprising a socket body having a second dielectric optical waveguide guideway extending therethrough between first and second faces of said socket body, said socket body located within a collar member, said first and second faces and said collar member defining two plug engaging means.

According to a fourth aspect of the present invention there is provided a three-part dielectric optical waveguide coupling for optically coupling two pluralities of lengths of dielectric optical waveguide, consisting of two plug means engaged in a socket means; each of said plug means comprising a plug body member, a plurality of guide members each having a first guideway extending therethrough rigidly fixed to said plug body member, one length of dielectric optical waveguide disposed at least partially within each of said first guideways, a plurality of slide members, each rigidly attached to one of said lengths of dielectric optical waveguide, each slide member in uni-directional sliding engagement with said plug body member; each of said socket means comprising a socket body member having a plurality of second guideways extending between first and second faces thereof; and locating means for locating said plug means relative to said socket means so that said first and second guideways are in register.

According to a fifth aspect of the present invention there is provided a dielectric optical waveguide coupler plug for use with a three-part dielectric optical waveguide coupling, comprising a plug body member, a plurality of guide members each having a first guideway extending therethrough rigidly fixed to said plug body member, and a plurality of slide members each arranged to permit a dielectric optical waveguide to be rigidly attached thereto; each slide member in uni-directional sliding engagement with said plug body member. According to a sixth aspect of the present invention there is provided a dielectric optical waveguide coupler socket for use with a three-part dielectric optical waveguide coupler, comprising a socket body member having first and second faces, and a plurality of second dielectric optical waveguide guideways located in said socket body member.

Embodiments of the invention will now be described by way of example with reference to the accompanying drawings in which:

FIG. 1 shows a section through a dielectric optical waveguide coupler for a single pair of dielectric optical waveguides prior to the waveguides.

FIG. 2 shows a section through a dielectric optical waveguide coupler for a single pair of dielectric optical waveguides after coupling the waveguide.

Figure 3:
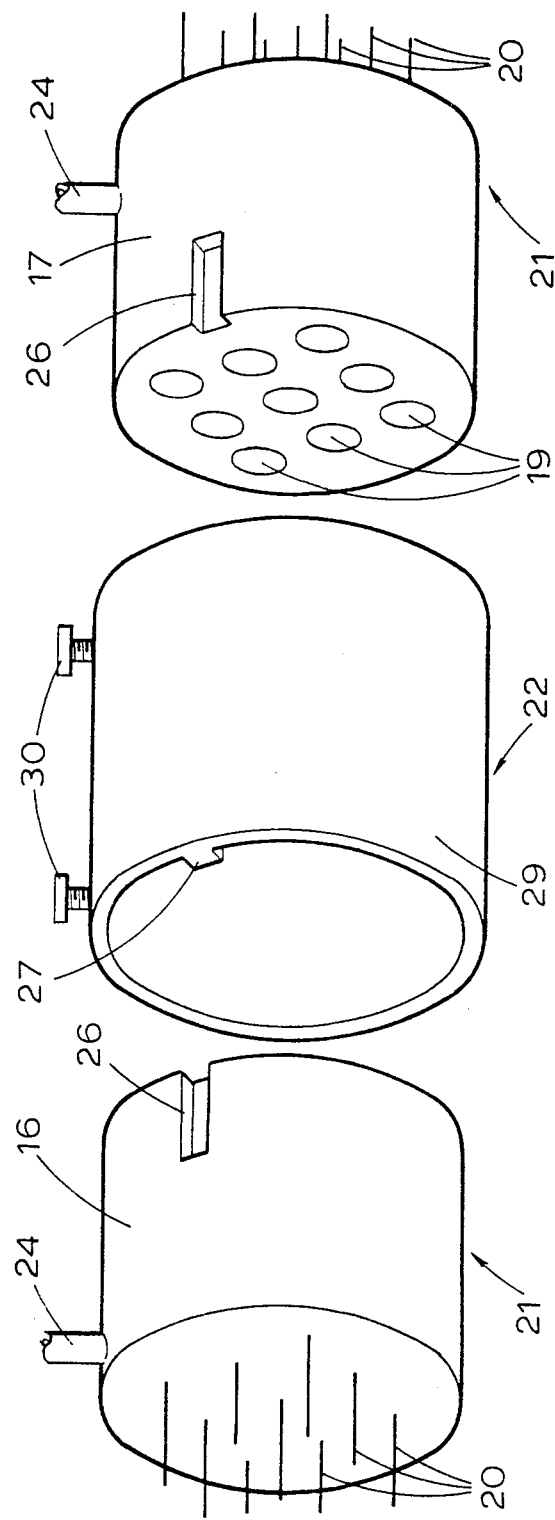
FIG. 3 shows a dielectric optical waveguide coupler for a plurality of pairs of dielectric optical waveguides.

Referring now to the drawings and FIG. 1 in particular, dielectric optical waveguide coupler plugs 10 are attached to the ends of dielectric optical waveguides 8 and 9, which are to be optically coupled. Each plug consists of two glass capillary bore tubes, 1 and 2, the bores of which are tapered at each end. The tube 2 is cemented inside a cylindrical slide 4, which is unidirectional sliding engagement with a sleeve 6. The end of tube 1 is cemented inside the sleeve 6. The cylindrical slide 4 is held temporally in place in sleeve 6 by a locking screw 11. The dielectric optical waveguides 8 and 9 are rigidly retained in tubes 1 by fillets of epoxy resin 12. The tubes 2 act as guides for the dielectric optical waveguides and the bores of these tubes act as guideways for the dielectric optical waveguides, and can slide freely over them.

The socket, 20, consists of a tube 3 having a capillary bore, acting as a dielectric optical waveguide guideway, which is tapered at each end, and held rigidly inside a cylindrical mounting comprising a tube 5 and collar 7. Tube 5 is identical in internal and external diameter to the cylindrical slide 4, and collar 7 has the same internal diameter as sleeve 6. Tube 3 has a bore diameter which is a close fit to the dielectric optical waveguides to be joined, being typically less than 15 microns larger than the diameter of the fibre. The tubes 1 and 2 have a bore diameter that is greater that 20 microns larger than the fibre diameter although if the bore diameter of tubes 1 and 2 is too large the fibres will not be properly in register. The tubes 1, 2, and 3 can be made in the manner disclosed in our co-pending U.S. application Ser. No. 497,095 filed Aug. 13, 1974.

Figures 4, 5:
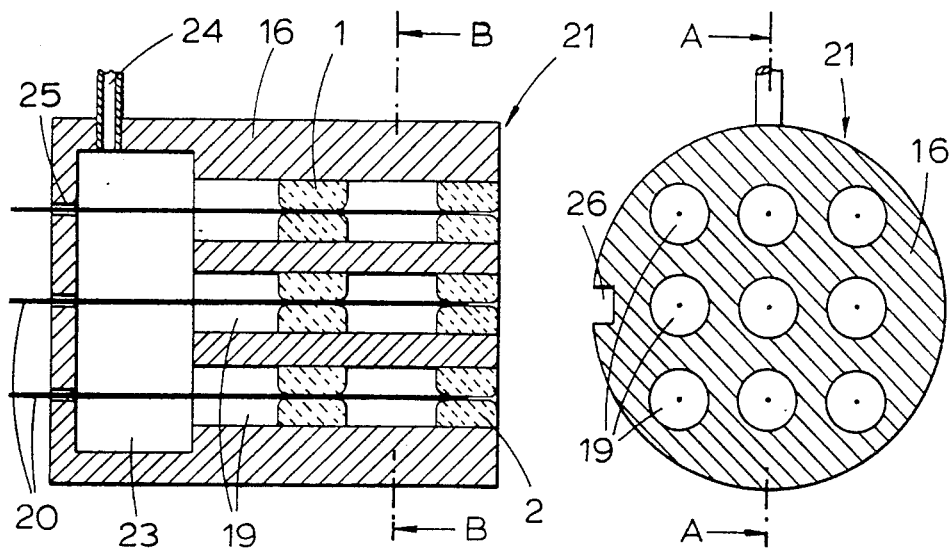
FIG. 4 shows a section through a plug of the coupler shown in FIG. 3 along line A—A of FIG. 5.
FIG. 5 shows a section through a plug of the coupler shown in FIG. 3 along line B—B of FIG. 4.

The elements of the joint are prefabricated in the following manner. The ends of the dielectric optical waveguides to be joined are prepared by the "scratch and pull" method, see our co-pending U.S. application Ser. No. 497,095 filed Aug. 13, 1974. The dielectric optical waveguide 8 is threaded through tube 1 into tube 2. It is held in tube 1 by a fillet of epoxy resin 12. Dielectric optical waveguide 9 is inserted into a plug in a similar manner. When the joint is to be formed, the tube 3 is filled with a refraction index matching liquid, e.g., immersion oil. The two plugs are inserted into the socket, and after the locking screws have been released, the sleeves 6 are pushed towards the socket. This action causes the dielectric optical waveguides 8 and 9 to be threaded into the bore of tube 3 until they come into contact. The outer annular edges of tube 5 act as a stop against which the slide 4 abuts. The plugs are retained in the socket by means of locking screws 13 and 14. The arrangement of the various components in a joint after forming is shown in FIG. 2. The plug and socket described above can be easily adapted to produce joints between a number of dielectric optical waveguides simultaneously. The coupling so formed consists of two plugs 21, see FIG. 3, and a socket 22. Each plug, See FIGS. 4 and 5, consists of a plug body member 16, which is foraminate. In each of the holes or foramina 19, there are located a pair of capillary bore tubes 1, and 2. Tubes 1 are rigidly attached to the dielectric optical waveguides 20, and are free to slide unidirectionally in the holes 19. Tubes 2 are rigidly fixed inside the holes 19, and act as guides for the dielectric optical waveguides 20, which are free to slide within the bores of the tubes 2. The tubes 1 and 2 are capillary bore glass tubes having capillary bores outwardly tapered adjacent ends of the tube. A chamber 23 is provided in the plug body 16, communicating with each of the holes 19. A pipe 24 connects with the chamber. The dielectric optical waveguides 20 pass through holes 25 in the rear wall of this chamber, these holes are of considerably greater diameter than the dielectric optical waveguides.

A keyway 26 is provided in the wall of the plug bodies 16 and 17. Each of the sockets 22 is provided with a pair of tongues 27 which engage in the keyways 26 to locate the plug and socket with respect to each other.

Figures 6, 7:
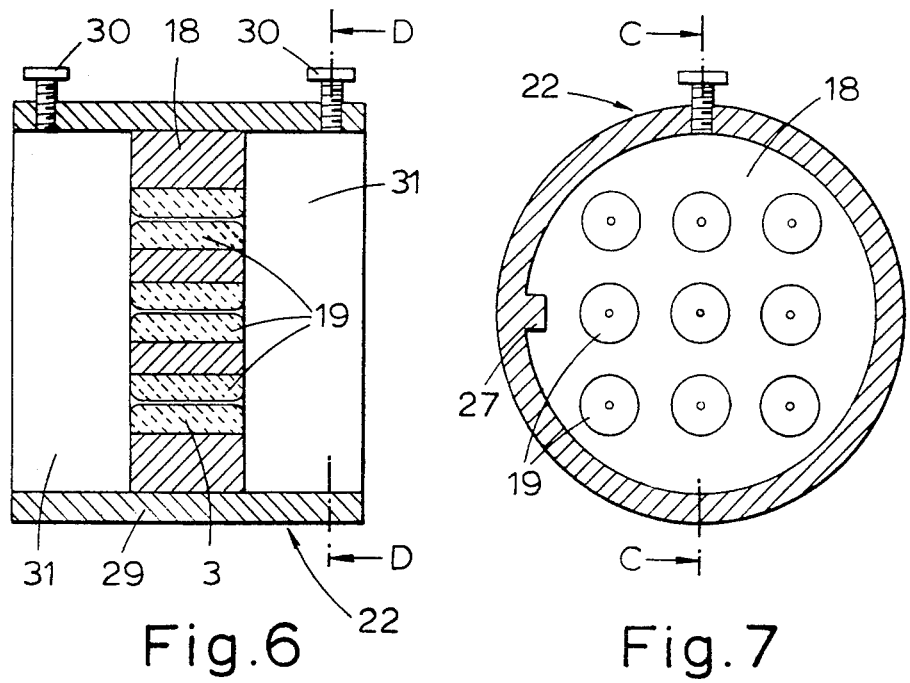
FIG. 6 shows a section through a socket of the coupler shown in FIG. 3 along line C—C of FIG. 7.
FIG. 7 shows a section through a socket of the coupler shown in FIG. 3 along line D—D of FIG. 6.

The socket 22 consists of a socket body 18, see FIGS. 6 and 7, enclosed in collar 29. The socket body is foraminate, with a number of holes or foramina 19 extending therethrough. A glass capillary bore tube 3 is located in each hole or foramen 19. The tubes 3 have a bore which is outwardly tapered adjacent ends of the tube. A pair of locating screws are provided in the collar 29 for retaining the plug in position when the coupling is assembled.

When the coupling is to be assembled, the two plugs 21 are inserted into the cavities 31 in the socket defined by the interior surface of the collar 29 and the end faces of socket body 18. The bores of tubes 2, in the plugs, and tubes 3, in the socket are, after assembly, substantially in register, because of the locating action of the tongue 22 and keyway 26. When the plugs are in position they are locked in place by locating screws 30.

Figure 8:
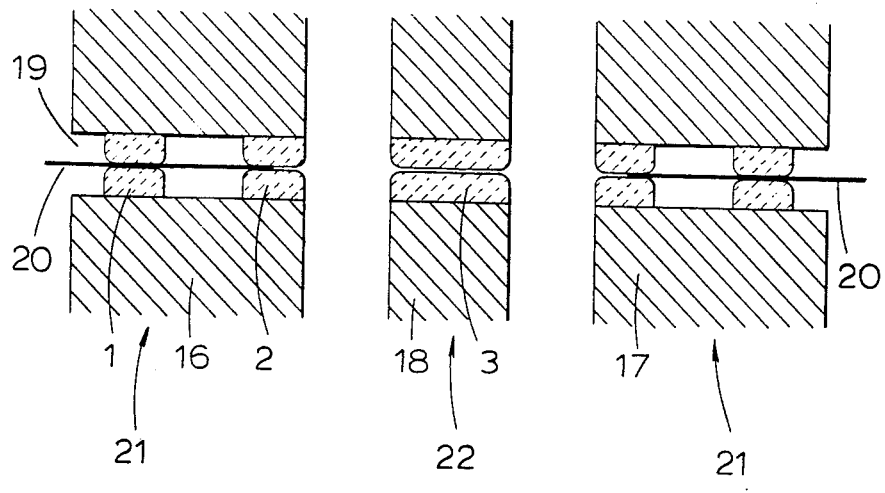
FIG. 8 shows sections through part of the dielectric optical waveguide coupler of FIG. 3 showing a single pair of dielectric optical waveguides in the coupled and uncoupled positions respectively.
Figure 8:
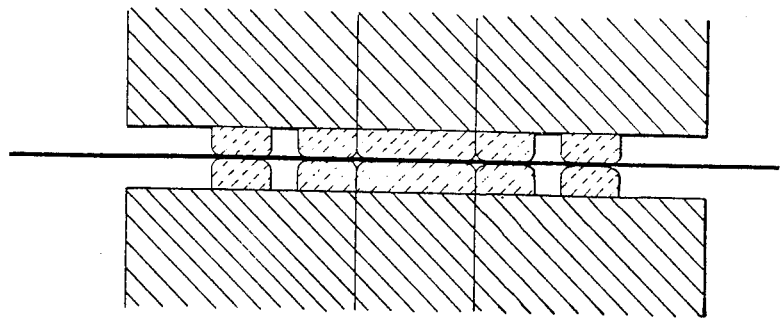

The optical connection between the dielectric optical waveguides is then made by feeding compressed air into chambers 23 via pipes 24 to bias the slides 1 in a forward direction. The dielectric optical waveguides then meet in the socket as shown in FIG. 8. An index matching liquid may be placed in the bores of capillary bores tubes 3 to enhance the efficiency of the optical coupling.

What we claim is:

1. A three-part dielectric optical waveguide coupling for optically coupling two lengths of dielectric optical waveguide consisting of two plug means engaged in a socket means; each of said plug means comprising a plug body member rigidly fixed to one of said lengths of dielectric optical waveguide, a slide means in unidirectional sliding engagement fixed with said plug body member, a guide member rigidly fixed to said slide means, said one length of dielectric optical waveguide disposed at least partially within a first dielectric optical waveguide guideway extending through said guide member, said guide member and slide means movable axially of said one length of dielectric optical waveguide; said socket means comprising a socket body having a second dielectric optical waveguide guideway extending therethrough between first and second faces of said socket body, said socket body located within a collar member, said first and second faces and said collar member defining two plug engaging means each arranged to receive and engage said slide means such that said first and second guideways are in register.

2. A dielectric optical waveguide coupler plug as claimed in claim 1 wherein said socket body is a sleeve and said slide means is a tubular member in sliding engagement with an interior surface of said sleeve, and said guide means is located at least partially within said slide means.

3. A dielectric optical waveguide coupler plug as claimed in claim 2 wherein each said plug body member includes a cylindrical member rigidly fixed to one of said lengths of dielectric optical waveguide.

4. A dielectric optical waveguide coupler as claimed in claim 3 wherein said cylinder member and said guide member have substantially identical cross-sections.

5. A dielectric optical waveguide coupler as claimed in claim 4 wherein said slide member is located partially within an annular guideway defined by an interior surface of said sleeve and an exterior surface of said cylindrical member.

6. A dielectric waveguide coupler plug as claimed in claim 5 wherein both said guide member and said retaining means comprise glass capillary bore tubes, said capillary bore outwardly tapered adjacent end surfaces of said capillary bore tubes.

7. A dielectric optical waveguide coupler plug as claimed in claim 6 wherein said sleeve is provided with slide locking means for locking the plug body members to said socket body.

8. A dielectric optical waveguide coupler plug as claimed in claim 7 wherein a guideway in said cylindrical member is threaded by said one length of dielectric optical waveguide, and said one length of dielectric optical waveguide is at least partially inserted into said first guideway.

9. A dielectric optical waveguide coupler socket for use in a three-part dielectric optical waveguide coupling as claimed in claim 1, comprising a socket body having a second dielectric optical waveguide guideway extending therethrough between said first and second faces of said socket body, said socket body located within a collar member, said first and second faces and said collar member defining two engaging means arranged to receive and engage said slide means such that said first and second guideways are in register.

10. A dielectric optical waveguide coupler socket as claimed in claim 9 wherein said collar means comprises first and second tubes, said second tube defining two annular stop members internally of said first tube.

11. A dielectric optical waveguide coupler socket as claimed in claim 10 wherein said socket body and said guide member have substantially identical cross sections.

12. A dielectric optical waveguide coupler socket as claimed in claim 11 wherein said collar member is provided with plug locking means for locking the plug body members to said socket body.

13. A three-part dielectric optical waveguide coupling for optically coupling two pluralities of lengths of dielectric optical waveguide, consisting of two plug means engaged in a socket means; each of said plug means comprising a plug body member, a plurality of guide members each having a first dielectric optical waveguide guideway extending therethrough and each rigidly fixed to said plug body member, one length of dielectric optical waveguide disposed at least partially within each of said first dielectric optical waveguide guideways, a plurality of slide members, each rigidly attached to one of said lengths of dielectric optical waveguide, each slide member in uni-directional sliding engagement with said plug body member; each of said socket means comprising a socket body member having first and second faces, said socket body member containing a plurality of second dielectric optical waveguide guideways; and locating means for locating said plug means relative to said socket means so that said first and second dialectric optical waveguide guideways are in register.

14. A dielectric optical waveguide coupler plug as claimed in claim 13 wherein said plug body member is foraminate, and said slide members are each a sliding fit in a foramen in said plug body member, each foramen having a guide member located therein.

15. A dielectric optical waveguide coupler as claimed in claim 14 wherein said guide member and slide member have substantially identical cross-sections.

16. A dielectric optical waveguide coupler plug as claimed in claim 15 wherein both said guide member and said retaining means comprises glass capillary bore tubes, said capillary bores outwardly tapered adjacent end surfaces of said capillary bore tubes.

17. A dielectric optical waveguide coupler plug as claimed in claim 16 wherein said plug body member is provided with socket locating means for aligning said plug body member in said socket means.

18. A dielectric optical waveguide coupler plug as claimed in claim 17 wherein said socket locating means is a key-way.

19. A dielectric optical waveguide coupler plug as claimed in claim 18 wherein there is provided actuable biassing means for biassing said slide members towards said guide member.

20. A dielectric optical waveguide coupler plug as claimed in claim 19 wherein said actuable biassing means is a chamber adapted to receive a pressurized fluid communicating with each of said foramen.

21. A dielectric optical waveguide coupler socket as claimed in claim 13 wherein said socket body member is located within a sleeve member, an interior surface of said sleeve member together with said first and second faces defining two plug engaging means arranged to receive a plug body member.

22. A dielectric optical waveguide coupler socket as claimed in claim 21 wherein said second guideways are capillary bores in capillary bore tubes, located in foramina in said socket body member.

23. A dielectric optical waveguide coupler socket as claimed in claim 22 wherein said plug body members and said socket body member include cooperative plug locating means for aligning said plug body members with said socket body member attached to said sleeve member 24. A dielectric optical waveguide coupler socket as claimed in claim 23 wherein said plug locating means is a tongue on said plane member arranged to cooperate with a key-way in said plug body member.

25. A dielectric optical waveguide coupler socket as claimed in claim 24 wherein said sleeve is provided with plug locking means for locking the plug body members to said socket body member.

* * * * *